Patented June 30, 1942

2,288,100

UNITED STATES PATENT OFFICE 2,288,100

CHEWING GUM BASE

George James Manson, Brantford, Ontario, Canada, assignor to Shawinigan Chemicals, Limited, Montreal, Quebec, Canada No Drawing. Application September 18, 1939, Serial No. 295,513. In Canada August 3, 1939

1 Claim. (Cl. 99—135)

The present invention relates to a chewing gum base and to improvements in the materials which go to make up the base.

Due to the difficulty in obtaining natural resins and gums, numerous attempts have been made to develop substitute bases having synthetic materials as their main constituent. A further incentive to these attempts has been the difficulty in obtaining natural gums of standard quality and at a stable price.

Numerous synthetic materials and combinations have been tried. However, they have had odour and taste which have made them unsatisfactory. Tasteless and odourless polyvinyl esters, both alone and with various extending agents have been tried with only qualified success. Thus a polyvinyl acetate-sulphur composition has been proposed. This has, however, the disadvantage that it blackens the gum making machinery now used. A polyvinyl acetate-mineral filler composition has also been proposed, the mineral filler being used to overcome the tendency of the acetate to stick to the teeth. The disadvantage with this is that the mineral filler, and particularly bentonite, is inclined to leave the polyvinyl acetate as the gum is chewed. As a result there is an unpleasant rough sensation in the mouth which makes this composition undesirable.

Polyvinyl ester-mineral filler compositions include of necessity a plasticiser which gives the synthetic compound the required chewing characteristics. The plasticizer must be physiologically innocuous, compatible with the ester, insoluble in water or saliva and substantially tasteless. Consequently the range of efficacious plasticisers is restricted. Those generally used are the higher esters of the phthalic type such as diamyl and dibutyl phthalate. It has been found that the taste of the plasticisers cannot be detected when the mineral filler is maintained in intimate contact with the polymer and does not get into the mouth.

It is an object of the present invention to overcome this disadvantage of previously known polyvinyl ester-mineral filler compositions and to provide a composition which has no tendency to lose its mineral filler upon being chewed, by incorporating in the composition an agent which prevents the mineral filler from leaving the remainder of the gum base.

It is a further object of the invention to increase the range of plasticisers which may be used by preventing the taste of the plasticisers being carried into the mouth by separation of the mineral filler.

The chewing gum base according to the invention consists of a polyvinyl ester, a plasticiser, a mineral filler and an agent which maintains the filler in intimate contact with the polyvinyl ester so that upon chewing the filler does not separate from the polyvinyl ester and enter the mouth. Although it has not been determined with certainty, it is thought that the action of the agent prevents the mineral filler from becoming wetted by the saliva when the gum is chewed. Accordingly for convenience the agent will be hereinafter referred to as a non-wetting agent.

The polyvinyl ester, preferably polyvinyl acetate, has a viscosity of between 1.5 and 6 centipoises and may contain not more than 0.05% aldehyde. The polyvinyl acetate used in the examples has a viscosity of 2.5 centipoises V 2.5.

The plasticiser must be compatible with polyvinyl acetate nontoxic and relatively insoluble in water. Due to the retention of the filler in the composition even during chewing, the range of plasticisers is increased and many of those which are now being developed will be suitable. Among those which have been successful are dibutyl phthalate, butyl phthalate, butyl phthalyl butyl glycollate, benzyl phthalate, amyl phthalate. The flavouring which is used in the blending of the chewing gum will also have a softening action and so when the polymer has a viscosity of approximately 1.5 centipoises a plasticiser will not be required. The amount of plasticiser will thus vary with the viscosity of the polymer, the amount of filler and the amount of non-wetting agent.

The mineral filler may be any inert, smooth, tasteless, non-toxic and odourless finely divided mineral material. The amount used will depend on the type of chewing gum base desired and the viscosity of the polymer used. From 10 per cent to 100 per cent mineral filler, based on the polymer can be used. The cost of the gum base is higher with a small amount of filler and the chewing qualities of the gum are not quite so excellent if more than about 100 per cent is used.

The non-wetting agent is any non-toxic oleaginous substance which is free from unpleasant taste or odour. The term "oleaginous substance" is used here to designate a wax, fat or oil or a mixture of the same. The amount of non-wetting agent used depends upon the viscosity of the polyvinyl ester, and the amount of plasticiser and mineral filler. It should be at least 10 per cent of the total ingredients.

Suitable colouring material can be added, brown iron oxides being quite satisfactory.

The ingredients are blended in a jacketed mixer at a temperature of 120° to 145° C. and may be added in any order, although preferably the plasticizer, non-wetting agent and color are put in the mixer first and when they are blended the polyvinyl acetate and mineral filler which have previously been ground together are slowly added. The blending proceeds easily and rapidly and the blend is run into shallow pans about ten minutes after all of the ingredients have been added.

The following examples are given by way of illustration. The percentages are by weight.

Example I

| | Per cent |
|---|---|
| Polyvinyl acetate V 2.5 | 38.0 |
| Chalk | 38.0 |
| Beeswax | 11.5 |
| Montan wax | 2.0 |
| Dibutyl phthalate | 10.0 |
| Brown iron oxide | 0.5 |

Example II

| | Per cent |
|---|---|
| Polyvinyl acetate V 2.5 | 41 |
| Chalk | 33 |
| Hydrogenated oil | 10 |
| Butyl phthalyl butyl glycollate | 15 |
| Brown iron oxide | 1 |

Example III

| | Per cent |
|---|---|
| Polyvinyl acetate V 2.5 | 44 |
| Clay | 28 |
| Paraffin | 13 |
| Montan wax (refined) | 4 |
| Dibutyl phthalate | 11 |

Example IV

| | Per cent |
|---|---|
| Polyvinyl acetate V 2.5 | 45 |
| Talc | 32 |
| Carnauba wax | 11 |
| Dibutyl phthalate | 12 |

Example V

| | Per cent |
|---|---|
| Polyvinyl acetate V 2.5 | 39 |
| Chalk | 26 |
| Kieselguhr | 12 |
| Paraffin | 12 |
| Butyl phthalyl butyl glycollate | 11 |

What I claim is:

A chewing gum base comprising a tasteless and odourless polyvinyl ester; a plasticiser compatible with polyvinyl ester, non-toxic and relatively insoluble in water; a mineral filler in the form of an inert, smooth, tasteless, non-toxic, odourless, finely divided mineral material; and a non-toxic oleaginous substance free from unpleasant taste or odour and adapted to prevent separation between the filler and ester.

GEORGE JAMES MANSON.